(12) United States Patent  
Endicott et al.

(10) Patent No.: US 6,549,953 B1  
(45) Date of Patent: *Apr. 15, 2003

(54) OBJECT ENCAPSULATION PROTECTION APPARATUS

(75) Inventors: John Clarence Endicott, Rochester, MN (US); Steven Lester Halter, Rochester, MN (US); Steven Jay Munroe, Rochester, MN (US); Erik Edward Voldal, Rochester, MN (US); Xin Xu, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 08/890,906

(22) Filed: Jul. 10, 1997

Related U.S. Application Data

(62) Division of application No. 08/336,581, filed on Nov. 9, 1994, now Pat. No. 5,742,826.

(51) Int. Cl.$^7$ ................................................. G06F 9/54
(52) U.S. Cl. ..................................................... 709/315
(58) Field of Search ................................ 709/300, 303, 709/315

(56) References Cited

U.S. PATENT DOCUMENTS

| | | | |
|---|---|---|---|
| 4,407,016 A | 9/1983 | Bayliss et al. | 364/200 |
| 4,713,753 A | 12/1987 | Boebert et al. | 364/200 |
| 5,129,084 A | 7/1992 | Kelly, Jr. et al. | 395/650 |
| 5,193,183 A | 3/1993 | Bachman | 395/600 |
| 5,195,178 A | 3/1993 | Krieger et al. | 395/157 |
| 5,202,981 A | 4/1993 | Shackelford | 395/600 |
| 5,212,771 A | 5/1993 | Gane et al. | 395/160 |
| 5,347,632 A | 9/1994 | Filepp et al. | 395/200 |
| 5,396,614 A | 3/1995 | Khalidi et al. | 395/425 |
| 5,404,525 A | 4/1995 | Endicott et al. | 395/700 |
| 5,410,702 A * | 4/1995 | Abraham et al. | 395/700 |
| 5,488,721 A | 1/1996 | Rich et al. | 395/600 |
| 5,539,909 A | 7/1996 | Tanaka et al. | 395/700 |
| 5,832,266 A * | 11/1998 | Crow et al. | 395/700 |

FOREIGN PATENT DOCUMENTS

| | | |
|---|---|---|
| FR | 0304348 | 10/1993 |
| JP | 2165223 | 6/1990 |

OTHER PUBLICATIONS

IBM Technical Disclosure Bulletin, vol. 33, No. 6A, p. 210, Nov. 1990, entitled "Three–Layer Window System for Visual Query" by S.G. Li.

IBM Technical Disclosure Bulletin, vol. 34, No. 4A, p. 398, Sep. 1991, entitled "Smalltalk/V PM Officevision Window" by. P. R. Chandler et al.

Model, Mitchel L., "Data Structures, Data Abstraction, A Contemporary Introduction using C++," Prentice Hall, p. 42.

* cited by examiner

Primary Examiner—St. John Courtenay, III  
(74) Attorney, Agent, or Firm—Steven W. Roth

(57) ABSTRACT

The present invention utilizes a hardware Window Storage Protection Controller (WSPC) and an Object Encapsulation Enforcement Manager (OEEM) to limit access to object data to only those methods which are encapsulated by the object All of the objects of the computer system which require protection are stored in protected storage by a base storage protection mechanism so that only the mechanisms of the present invention can deny or permit access to the data encapsulated by the objects.

21 Claims, 18 Drawing Sheets

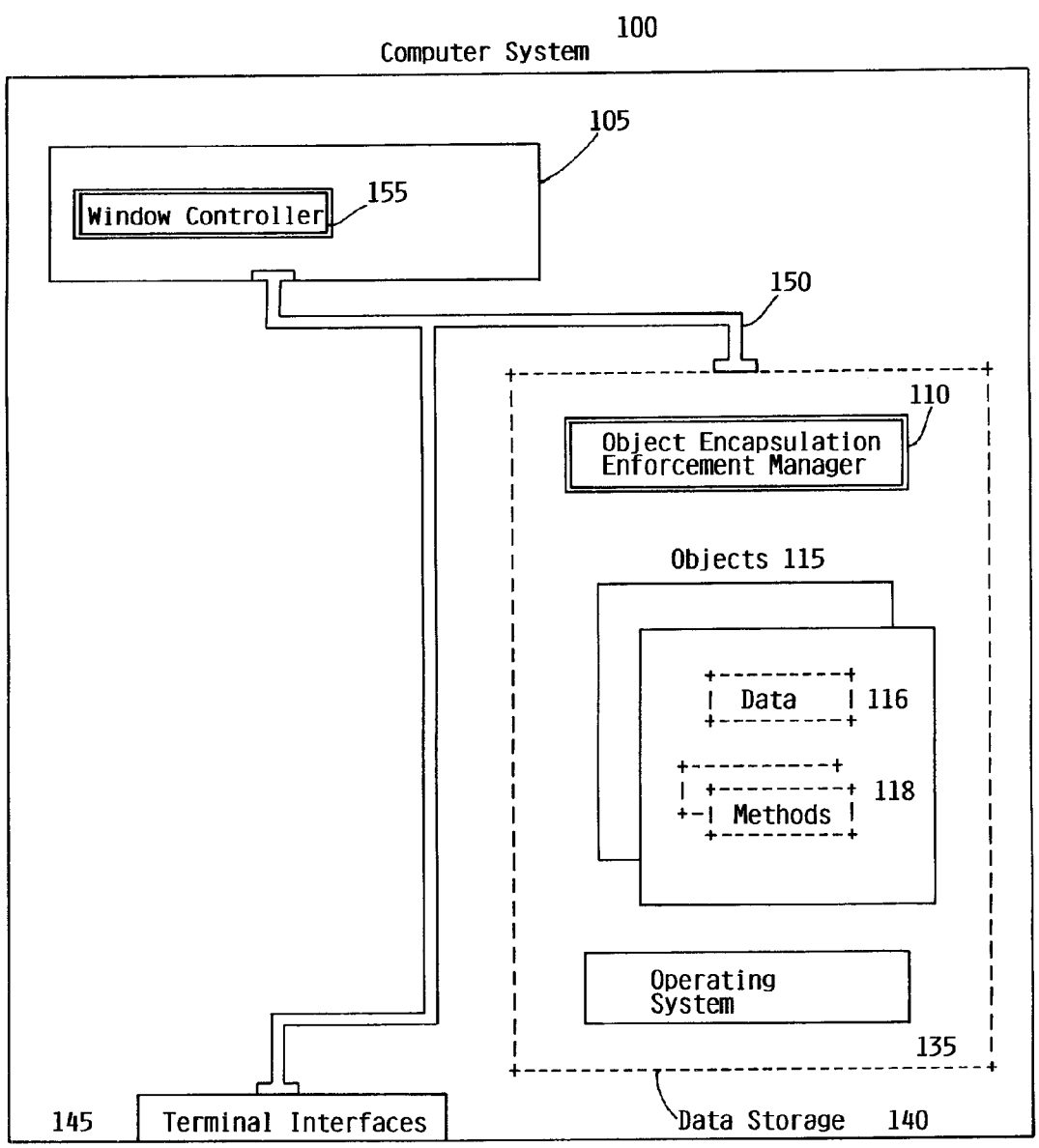
FIG. I

| Length | Masks |
|---|---|
| 1 byte | FFFFFFF |
| 2 bytes | FFFFFFE |
| 4 " | FFFFFFC |
| 8 | FFFFFF8 |
| 16 | FFFFFF0 |
| 32 | FFFFFE0 |
| 69 | FFFFFC0 |
| 128 | FFFFF80 |
| 296 | FFFFF00 |
| 912 " | FFFFE00 |
| 1 KB | FFFFC00 |
| 2 KB | FFFF800 |
| 4 KB | FFFF000 |
| 8 KB | FFFE000 |
| 16 KB | FFFC000 |
| 32 | FFF8000 |
| 64 | FFF0000 |
| 128 | FFE0000 |
| 256 KB | FFC0000 |
| 512 KB | FF80000 |
| 1 MB | FF00000 |
| 2 | FE00000 |
| 4 | FC00000 |
| 8 | F800000 |
| 16 | F000000 |
| 32 | E000000 |
| 64 | C000000 |
| 128 | 8000000 |
| 256 MB | 0000000 |

FIG. 4

OBJECT ENCAPSULATION PROTECTION APPARATUS

This is a divisional of application Ser. No. 08/336,581 filed on Nov. 9, 1994 now U.S. Pat. No. 5,742,826 issued Apr. 21, 1998.

FIELD OF THE INVENTION

This invention relates to the data processing field. More specifically, this invention relates to object encapsulation within an object oriented programming environment.

BACKGROUND OF THE INVENTION

The development of the EDVAC computer system of 1948 is often cited as the beginning of the computer era. Since that time, computer systems have found their way into just about every aspect of the American life style. One reason for this proliferation is the ability of computer systems to perform a variety of tasks in an efficient manner. The mechanisms used by computer systems to perform these tasks are called computer programs.

Like computer systems themselves, the development of computer programs has evolved over the years. The EDVAC system used what was called a "one address" computer programming language. This language allowed for only the most rudimentary computer programs. By the 1960s, improvements in computer programming languages led to computer programs that were so large and complex that it was difficult to manage and control their development and maintenance.

Hence, in the 1970s, focus was directed away from developing new programming languages towards the development of programming methodologies and environments which could better accommodate the increasing complexity and cost of large computer programs. One such methodology is the Object Oriented Programming (OOP) approach. OOP advocates claim that this approach to computer programming can improve the productivity of computer programmers by as much as twenty-five fold. Hence, while it has been some time since OOP technology was originally developed, it is currently seen as the way of the future.

Not surprisingly, objects are central to OOP technology. Objects can be thought of as autonomous agents which work together to perform the tasks required of the computer system. A single object represents an individual operation or a group of operations that are performed by a computer system upon information controlled by the object. The operations of objects are called "methods" and the information controlled by objects is called "object data" or just "data." Methods and object data are said to be "encapsulated" in the object. The way an object acts and reacts relative to other objects is said to be its "behavior." Since the proper function of the computer system depends upon objects working together, it is extremely important for each object to exhibit a consistent behavior.

When a method of one object needs access to the data controlled by a second object, it is considered to be a client of the second object. To access the data controlled by the second object, one of the methods of the client (i.e., a client method) will call or invoke the second object to gain access to the data controlled by that object. One of the methods of the called object (i.e., a server method in this case) is then used to access and/or manipulate the data controlled by the called object. Limiting access to the called object's own methods is critical because each object's ability to exhibit a consistent behavior depends on its ability to prevent the methods of other objects from directly accessing and manipulating its data. Indeed, limiting access to the called object's own methods is so critical that the whole OOP methodology breaks down if this encapsulation is not preserved.

SUMMARY OF THE INVENTION

It is a principal object of this invention to provide an enhanced mechanism which limits access to object data to only the methods of the subject object.

It is another object of this invention to provide an enhanced mechanism which permits access by a plurality of methods to only the object data of their object.

It is yet another object of this invention to provide an enhanced mechanism which limits access to object data to only the methods of the subject object by permitting access on the basis of memory aggregates that are smaller than pages, segments and other similar predetermined memory boundaries.

It is still another object of this invention to provide an enhanced mechanism which limits access to object data to only the methods of the subject object by permitting access on the basis of a memory aggregate which is equivalent in size to the space required for the object data itself.

These and other objects are accomplished by the data protection mechanisms and apparatus disclosed herein.

The present invention utilizes a hardware Window Storage Protection Controller (WSPC) and an Object Encapsulation Enforcement Manager (OEEM) to limit access to object data to only those methods which are encapsulated by the object. All of the objects of the computer system which require protection are stored in protected storage by a base storage protection mechanism so that only the mechanisms of the present invention can deny or permit access to the data encapsulated by the objects. For the most part, the object identifier for each object is known by all other objects. The object identifier is essentially the address of the object in storage. If a client method attempts to gain access to another object's data without first interacting with the OEEM (i.e., perhaps via the other object s identifier), the access will be denied by the base storage protection mechanism.

When a method of one object (i.e., a client) wants to access and/or manipulate the data encapsulated in a second object, it presents the object identifier (also denoted as object ID and OID) to the OEEM. The OEEM then takes the object identifier, the length of the object, and the access permissions (i.e., read and write permissions for example) of the client and loads them into special registers within the WSPC. (While the present invention utilizes the object identifier and object length to delineate the address range of objects, those skilled in the art will appreciate that other mechanisms could have been used without loss of generality.) The OEEM then invokes the appropriate method of the called object. When this method attempts to access the data encapsulated within the called object, the WSPC verifies that the data to be accessed is actually encapsulated by the object identified by the object identifier and that the type of access (i.e., read v. write) is a permitted activity for this particular client. If the requested access is directed at data that is actually encapsulated by the called object and the type of access is a permitted activity for this particular client, the WSPC overrides the base storage protection mechanism and allows the requested access to proceed. However, if the requested access is directed at data that is not encapsulated by the called object or if the type of access requested is not a permitted activity for this particular client, the WSPC allows the base storage protection mechanism to deny the requested access.

BRIEF DESCRIPTION OF THE DRAWINGS

FIGS. 3A-1 through FIG. 3G-2 show schematic diagrams of the Window Storage Protection Controller of the present invention.

FIG. 4 shows the length masks used in the preferred embodiment.

DESCRIPTION OF THE PREFERRED EMBODIMENT

Figures 1, 3A:
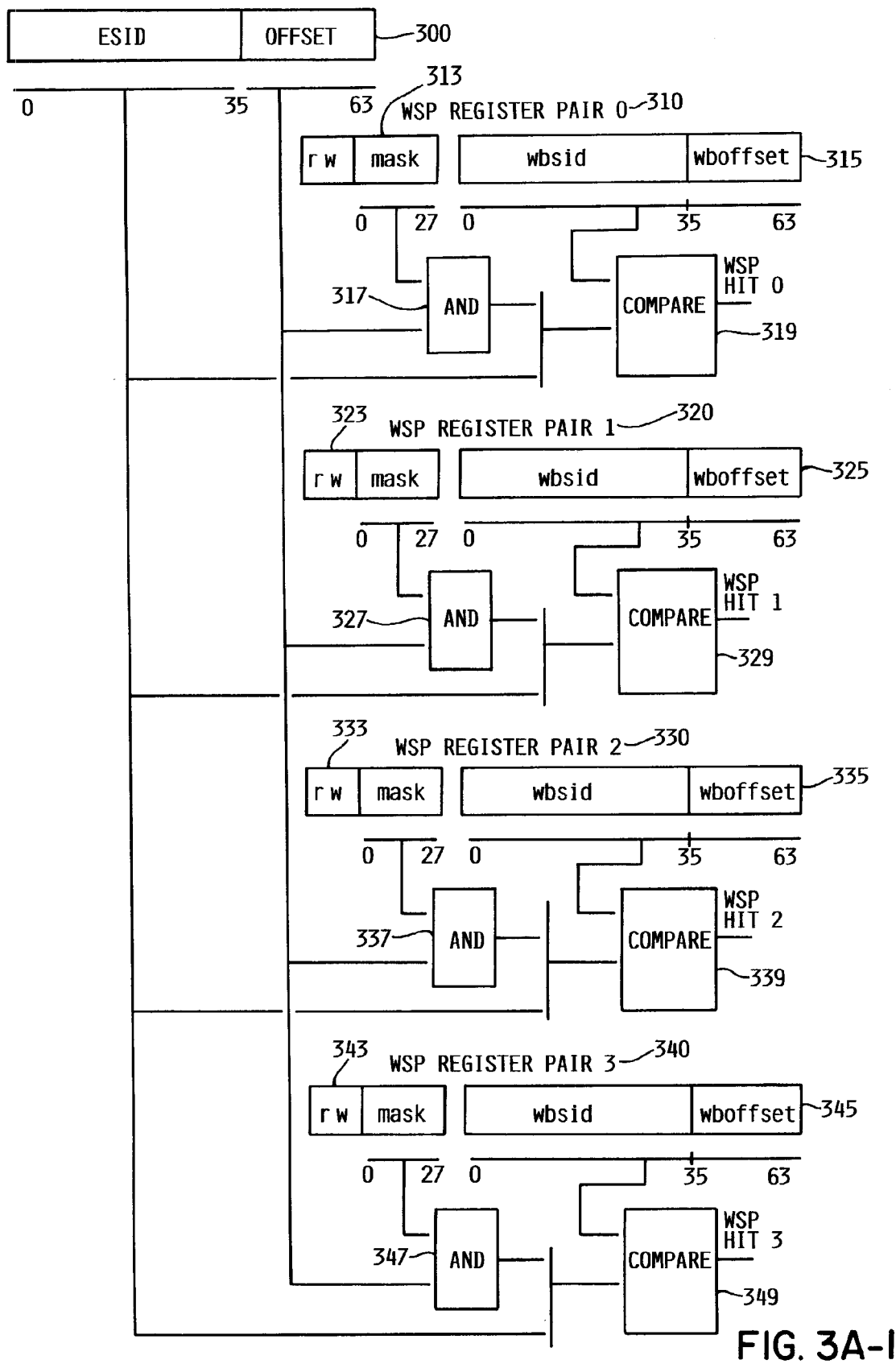

FIG. 1 shows a block diagram of the computer system of the present invention. The computer system of the preferred embodiment is an enhanced IBM AS/400 mid-range computer system. However, those skilled in the art will appreciate that the mechanisms and apparatus of the present invention apply equally to any computer system, regardless of whether the computer system is a complicated multiuser computing apparatus or an imbedded processor found in a personal electronic device such as a television or a microwave oven. As shown in the exploded view of FIG. 1, computer system 100 comprises main or central processing unit (CPU) 105 connected to data storage 140 and terminal interface 145 via system bus 150. CPU 105 is further shown to include Window Storage Protection Controller (WSPC) 155. WSPC 155 is one of the mechanisms used by the present invention to limit access to object data to only those specific methods that are responsible for accessing and/or manipulating data encapsulated in the object. Terminal interface 145 allows system administrators and computer programmers to communicate with computer system 100, normally through programmable workstations. Although the system depicted in FIG. 1 contains only a single main CPU and a single system bus, it should be understood that the present invention applies equally to computer systems having multiple main CPUs and multiple I/O buses. Similarly, although the bus of the preferred embodiment is a typical hardwired, multidrop bus, any connection means that supports bi-directional communication could be used.

Data storage 140 contains Object Encapsulation Enforcement Manager (OEEM) 110, objects 115, and operating system 135. Objects 115 of the preferred embodiment are shown to include Data 116 and Methods 118; however, it should be understood that he present invention applies equally to OOP environments in which object data and method programs are stored separately. While data storage 140 is shown as a monolithic entity, it should be understood that data storage 140 may comprise a variety of devices, and that all programs and files shown will not necessarily be contained in any one device. For example, OEEM 110 and operating system 135 will typically be loaded into primary memory to execute, while source data files will typically be stored on magnetic or optical disk storage devices.

High Level Overview

FIGS. 2A, 3A-1, and 3A-2 will now be used to present a high level overview of OEEM 110 and WSPC 155. As mentioned above, client methods call or invoke server methods to perform the tasks that they were designed to carry out. This step is shown in block 200 of FIG. 2A. Any time a client method wants to invoke a server method, it first calls OEEM 110. In the preferred embodiment, the call to OEEM 110 is "compiled in" to the client mechanisms; however, those skilled in the art will appreciate that any mechanism that passes control to OEEM 110 could be used. OEEM 110, like Operating System 135, is a privileged mechanism. Privileged mechanisms are given access to all of the resources of Computer System 100, including all of the registers contained in CPU 105. Client and server methods, however, are considered user mechanisms. Unlike privileged mechanisms, user mechanisms must call or invoke a privileged mechanism to gain access to the resources of Computer System 100. Since the present invention relies on the fact that only OEEM 110 has access to the registers of WSPC 155, it is significant that OEEM 110 is a privileged mechanism and that client and server methods are not. However, those skilled in the art understand that the concept of privileged mechanisms (sometimes called privileged mode, supervisor mode, or kernel mode mechanisms) as opposed to user mechanisms (sometimes called problem state, user state, or application state mechanisms) is well known in the art. Therefore, those skilled in the art will appreciate that the present invention applies equally to all computer systems, regardless of the specific means used to grant specific permissions to some mechanisms and to deny those same permissions to other mechanisms.

Figure 2A:
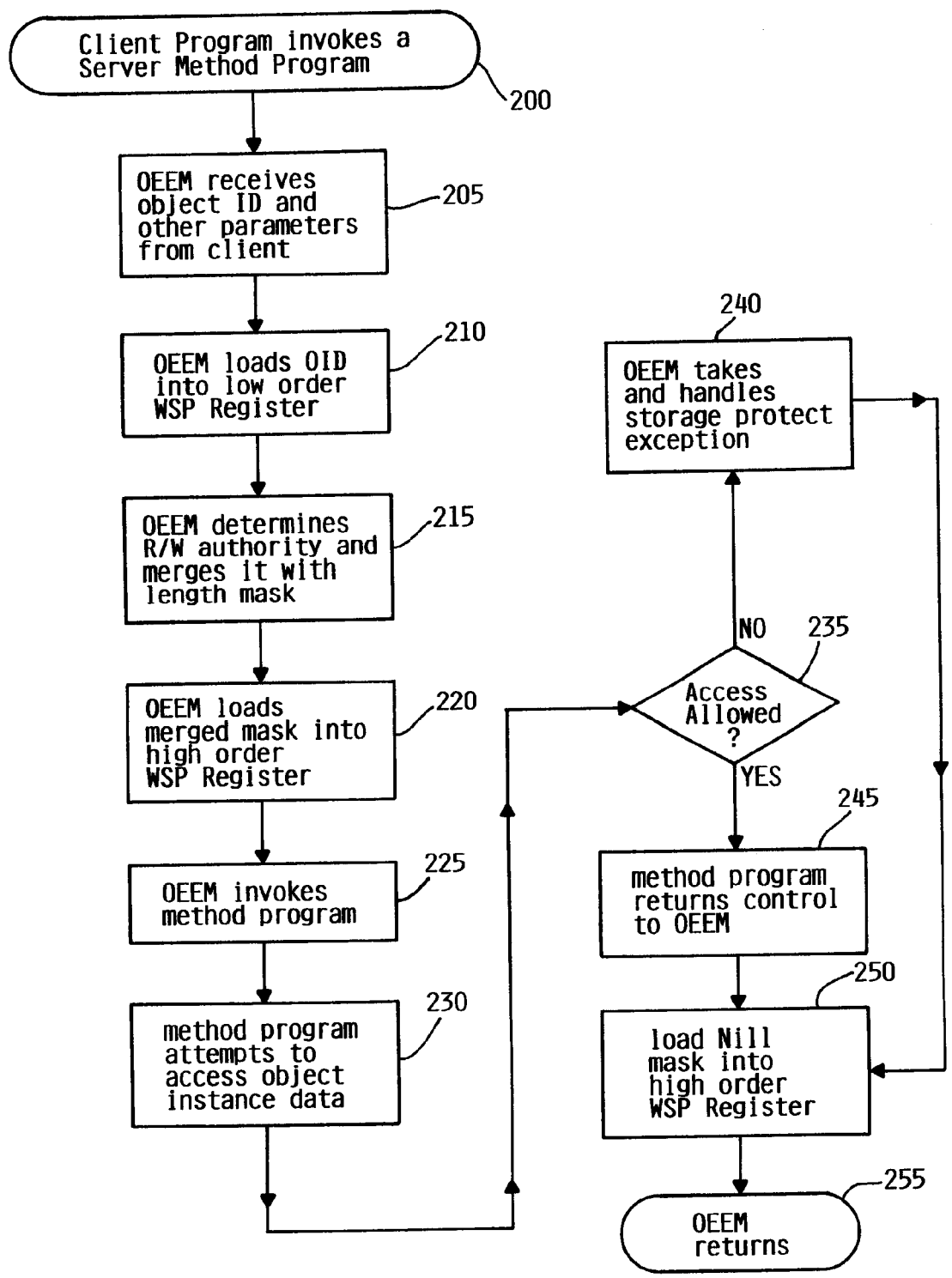
FIG. 2a shows a flow diagram of the Object Encapsulation Enforcement Manager of the present invention.

When a client method invokes OEEM 110, OEEM 110 receives the object ID (OID) of the object that the client program wants to call and any other parameters that may be needed [block 205 of FIG. 2A]. OEEM 110 then loads the OID into the low order register of the appropriate window storage protection register pair of WSPC 155 [block 210]. As mentioned above, client methods are user mechanisms and, as such, do not have access to the registers of WSPC 155. FIG. 3A-1 is a schematic drawing of the front end circuitry of WSPC 155. As shown, the preferred embodiment calls for WSPC 155 to include four window storage protection register pairs (i.e., Window storage protection register pairs 310, 320, 330, and 340). The choice of four window storage protection register pairs is a design choice. Upon reading this specification, those skilled in the art will appreciate that other variations are possible within the spirit and scope of the present invention. Each window protection pair further comprises a low order register (i.e., low order registers 315, 325, 335, and 345) and a high order register (i.e., high order registers 313, 323, 333, and 343). For the purposes of this high level overview, assume that the "appropriate" register mentioned above is Window storage protection register pair 310. Therefore the low order register used by OEEM 110 will be low order register 315.

Referring back to FIG. 2A, OEEM 110 next calculates a merged mask and ascertains the access permissions of the server method that will handle the client method's request [block 215]. The merged mask represents the length of the object identified by the OID and the access permissions define the operations that the server method is allowed perform (e.g., read and/or write). The particular means chosen to determine the client method's access permissions and the length of the called object are not important to the present invention. OEEM 110 then loads the merged mask into the high order register of WSPC 155 (i.e., high order register 313 of FIG. 3A-1 in this case) [block 220]. In block 225, OEEM 225 selects the appropriate server method and invokes it. Once control has passed to the server method, the server method attempts to access the data encapsulated in the object identified by the OID. This causes the memory address associated with the attempted access (i.e., an address in Data Storage 140) to be presented to WSPC 155 (See 300 on FIG. 3A-1). This causes the product of the offset portion of the presented address and the length mask (AND Gate 317) to be combined with the segment ID portion of the address. (While the AS/400 addressing structure uses segmented addressing to minimize address translation costs; however, those skilled in the art will appreciate that the other addressing schemes, such as unsegmented global inverted page tables or two or three level virtual indexed page tables, could also be used without departing from the spirit and scope of the present invention.) This value is then compared with the OID previously loaded into low order register 315 (i.e., by Compare circuit 319). If the presented address is within the memory space occupied by the object identified by the OID (i.e., the OID plus the length of the object), the output of Compare Circuit 319, denoted as WSP Hit 0, is a logical 1. If the presented address is not within the memory space occupied by the object identified by the OID, the output of Compare Circuit 319, is a logical 0. Assume for the purposes of this high level overview that WSP Hit 0 is equal to logical 1.

Figures 2, 3A:
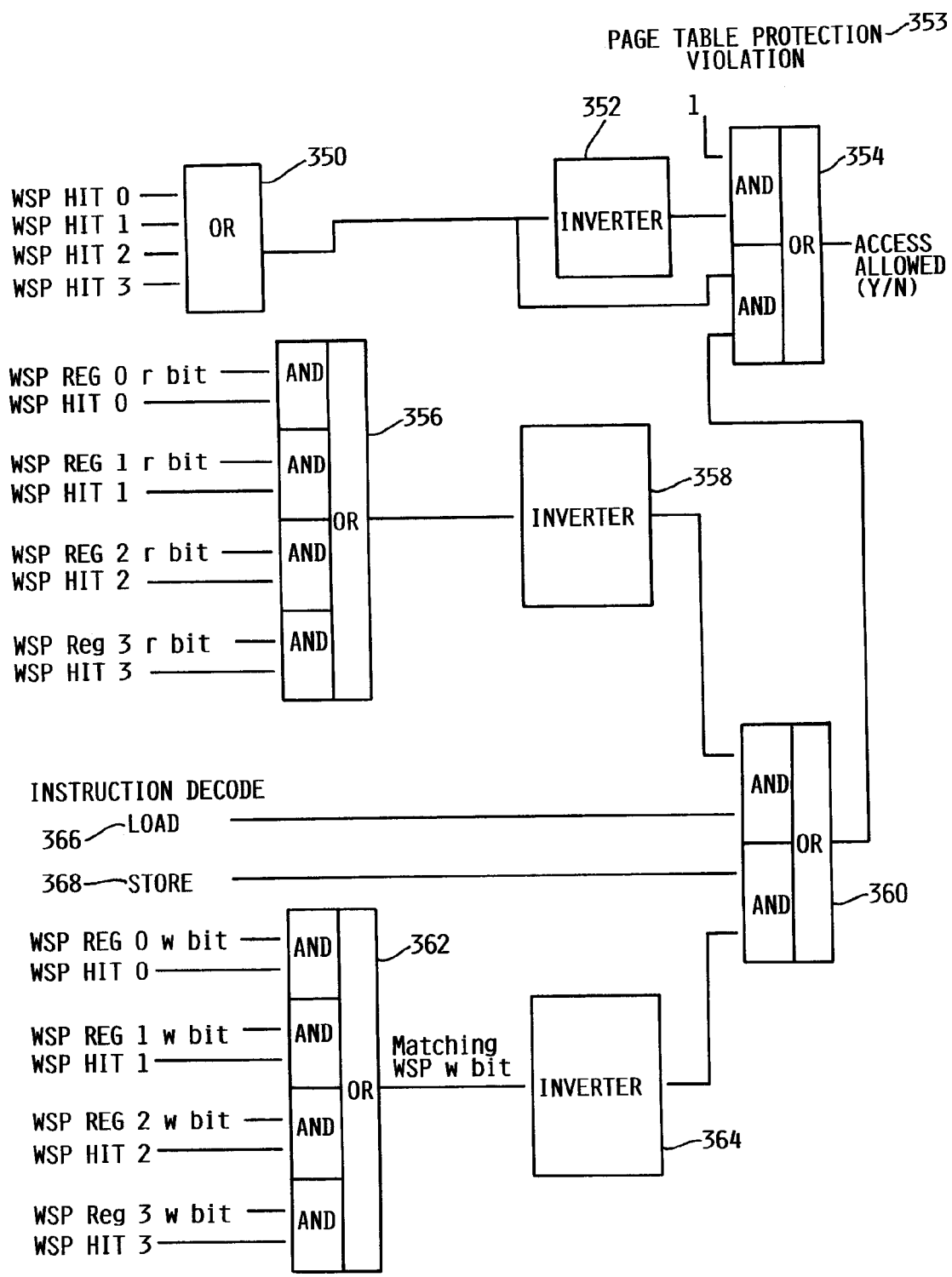

FIG. 3A-2 is a schematic drawing of the back end circuitry of WSPC 155. WSP Hit 0 becomes an input to OR Gate 350 which gets carried through to Inverter 352 and to AND/OR Complex 354. Since the output of OR Gate 350 will be logical 1, its output, and the associated input to AND/OR Complex 354, will be a logical 0. Page Table Protection Violation (PTPV) flag 353 is generated by the base storage protection mechanism. Since, as mentioned, objects requiring protection are stored in protected storage by the base storage protection mechanism, the value of PTPV flag 353 will always be logical 1.

The last input to AND/OR Complex 354 is generated by AND/OR Complex 360. The output of AND/OR Complex 360 is derived from Inverters 358 and 364, from AND/OR Complexes 356 and 362, and from Instruction Decode flags Load 366 and Store 368. As shown, WSP Hit 0 is also an input to AND/OR Complexes 356 and 362. The read and write permissions that were previously loaded into high order register 313 by OEEM 110 are also inputs to AND/OR Complexes 356 and 362 (denoted as WSP REG 0 r bit and WSP REG 0 w bit respectively). For the purposes of this high level overview, assume that the server method has been given both read and write permission. Therefore, WSP REG 0 r bit and WSP REG 0 w bit will both have a value of logical 1. Instruction Decode flags Load 366 and Store 368 represent the particular operation that is sought to be performed by the client method (i.e., Load=read and Store=write). Since in this example the client object has both read and write permission, the value of the Instruction Decode flags is irrelevant (i.e., the values of those flags are DONT CAREs). However, the values do become important when a server method attempt to read without read permission or attempts to write without write permission.

Since WSP REG 0 r bit and WSP Hit 0 both have a value of logical 1, the output of AND/OR Complex 356 will be logical 1 as well. Inverter 358 inverts this signal such that the input to AND/OR Complex 360 is a logical 0. In total, then, the four input values to AND/OR Complex 354 are as follows:

PTPV flag 353=logical 1;
Inverter 352 output=0;
WSP Hit 0=1; and
AND/OR Complex 360 output=0.

These inputs to AND/OR Complex 354 result in an output of logical 0 from AND/OR Complex 354. An output of logical 0 essentially overrides the base storage protection mechanism (i.e., the state of which is identified as PTPV flag 353) which means that the server method is authorized to access the data encapsulated in the object identified by OID. In other words the present invention opens an "access window" across the object identified by the OID such that the server method can gain access to the data encapsulated therein. Referring back to FIG. 2A, this result is seen by OEEM 110 in block 235. After the server method has finished accessing the data encapsulated in the object identified by OID, the server method returns control to OEEM 110 in block 245. In block 250, OEEM 110 loads a Nill mask into high order register 313 which essentially disables WSPC 155. OEEM 255 then returns control and any appropriate parameters to the calling client method [block 255].

Detailed Example

Figure 2B:
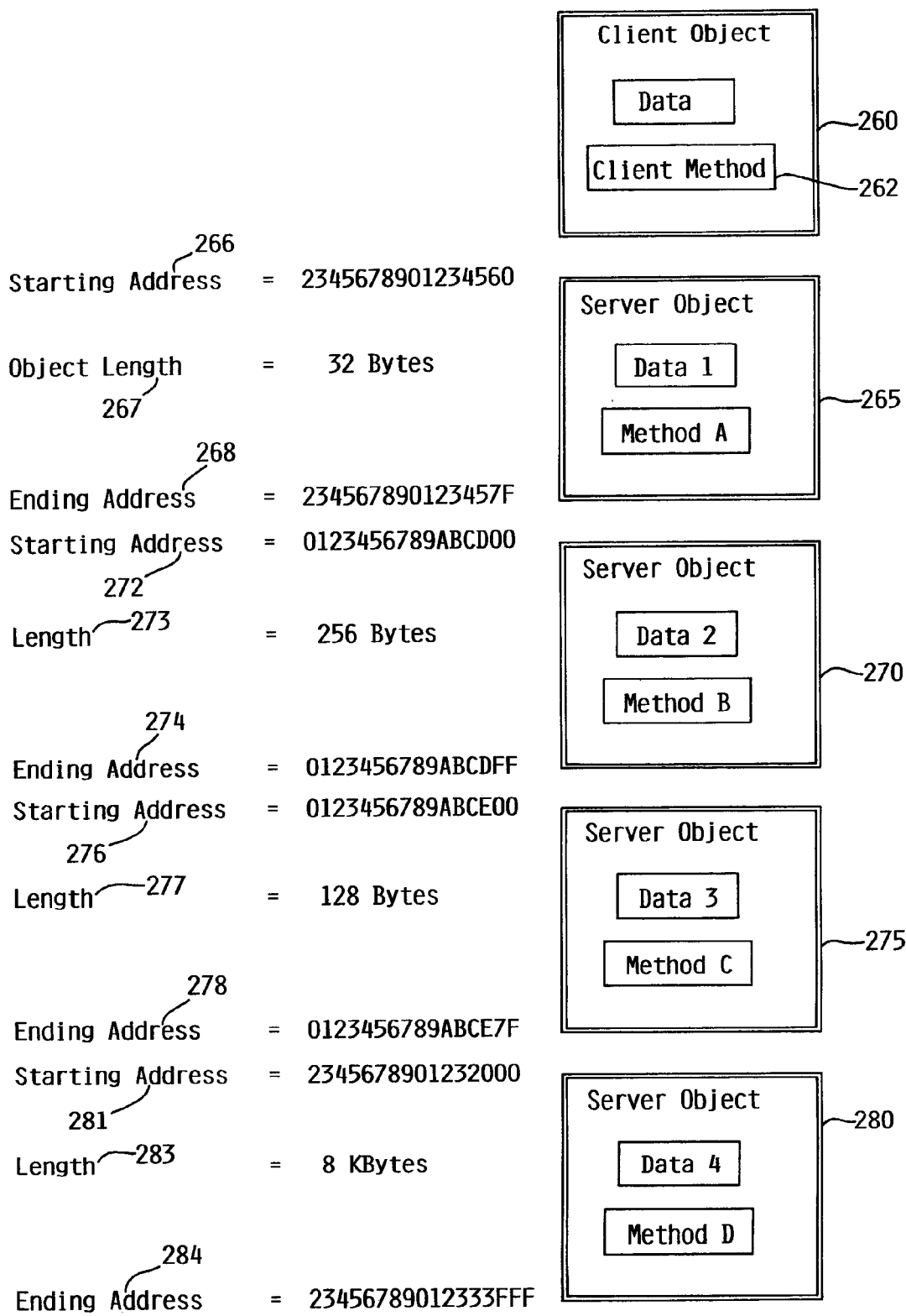
FIG. 2b shows example objects accordingly to the preferred embodiment

FIGS. 2B and FIGS. 3B-1 through 4 will now be used to present a detailed example of how the mechanisms of the present invention work together to efficiently enforce object encapsulation. FIG. 2B shows a portion of data storage 140 which contains five example objects. Example objects 260, 265, 270, 275, and 280 each comprise data and a method. Client Object 260 comprises data and a client method, while Sever Objects 265, 270, 275, and 280 each comprise data and respective single Server Methods A, B, C, and D. Although example objects 260, 265, 270, 275, and 280 are shown to contain only a single method program, those skilled in the art understand that the present invention applies equally to objects that contain any number of methods. The starting and ending addresses and the lengths of each of Server Objects 265, 270, 275, and 280 is also shown on FIG. 2B. For example, Starting Address 266 of Server Object is 265 #2345678901234560, Ending Address 268 is #2345670123457F, and Length 273 is 32 bytes (B). Please note that all values denoted herein with a "#" sign should be considered base 16 (i.e., hexidecimal)

Method A Accesses Data Encapsulated Within Server Object 265

For the purposes of this detailed example, assume that Client Object 260 wants to invoke Method A of Server Object 265 (hereafter Method A) to indirectly gain access to the data encapsulated in Server Object 265. As mentioned above, this will cause OEEM 110 to be invoked by Method A. As shown on FIG. 3B-1, OEEM 110 will load the OID for Server Object 265 (i.e., Starting Address 266) into low order register 315. OEEM 110 will then calculate an appropriate length mask for Length 267 and ascertain the read and write permissions of Method A. OEEM 110 will then load the mask and the permissions into high order register 313 (See FIG. 3B-1). As shown on FIG. 4, the appropriate length mask for an object that is 32 B in length is #FFFFFE0. Assume for the purposes of this detailed example that Method A has both read and write permission. Again, those skilled in the art will understand that the particular means used to determine the read and write permissions of client and server methods is not important to the present invention.

After loading the WSP Register Pair 310 appropriately, OEEM 110 transfers control to Method A. Method A will then attempt to access the data encapsulated in Server Object 265. Since Method A is attempting to access data encapsulated in Server Object 265, the address used by Method A will be somewhere within the range of #2345678901234560 to #234567890123457F. Therefore, the product of the offset and the length mask (i.e., the output of AND Gate 317) will be #1234560. When combined with the Segment ID, the address becomes #2345678901234560. This value is then compared to the OID contained in low order register 315 through the use of Compare Circuit 319. In this case, the values match, meaning that the output of Compare Circuit 319 (WSP Hit 0) is logical 1.

Figures 1, 3B:
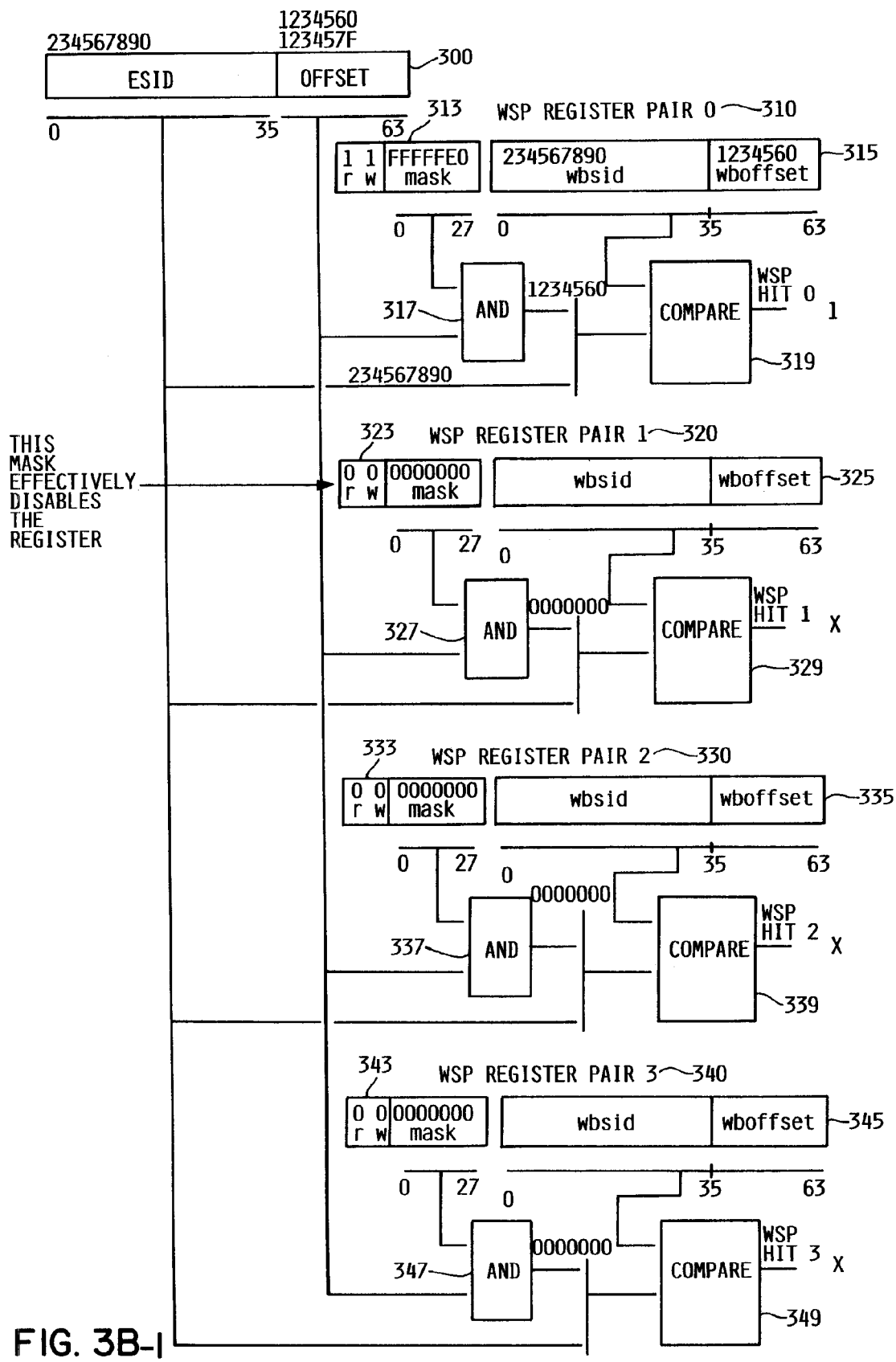
FIG. 1 shows the computer system of the preferred embodiment.
Figures 2, 3B:
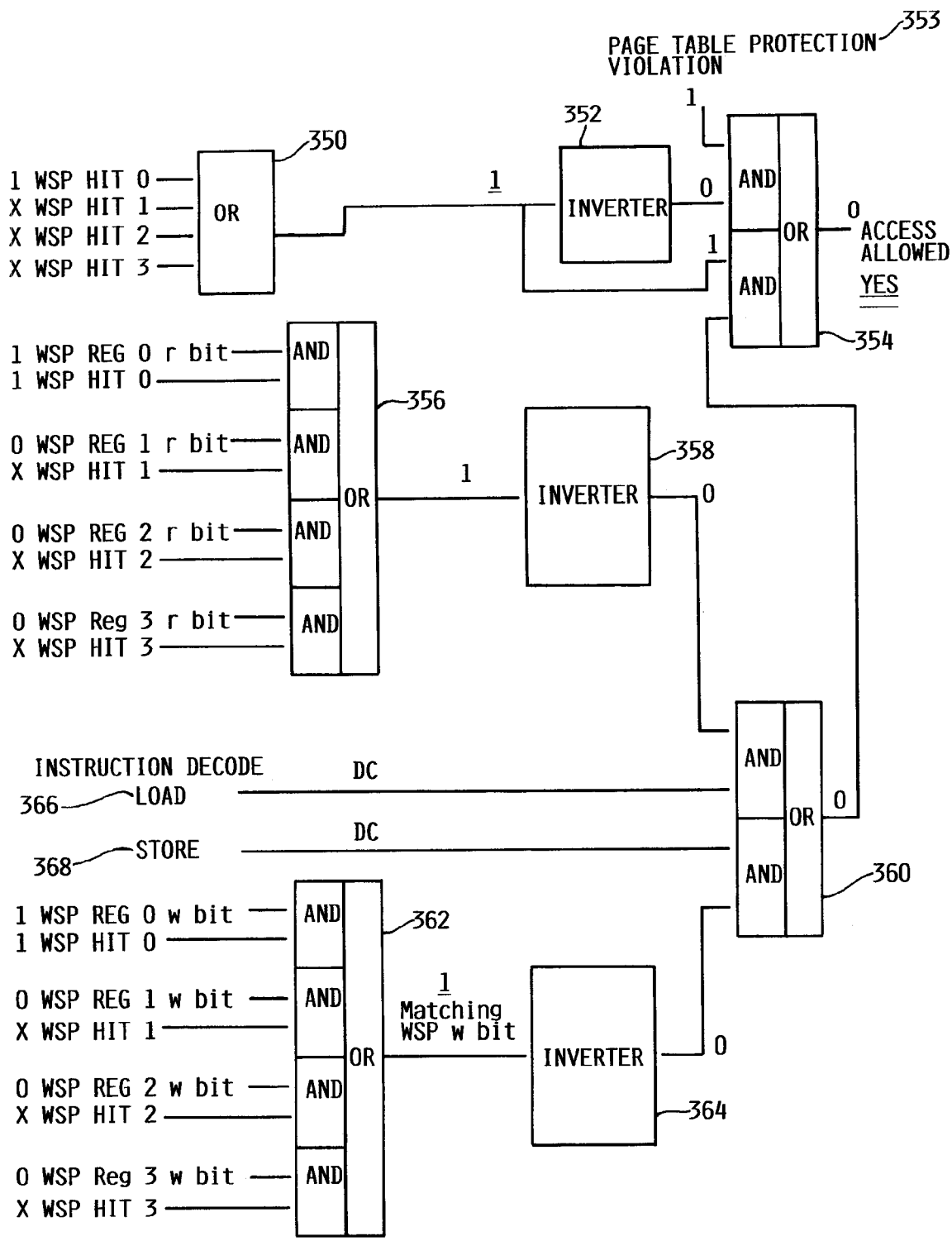

Referring now to FIG. 3B-2, WSP Hit 0 becomes an input to OR Gate 350 which gets carried through to Inverter 352 and to AND/OR Complex 354. Since the output of OR Gate 350 will be logical 1, its output, and the associated input to AND/OR Complex 354, will be a logical 0. As mentioned above, the value of PTPV flag 353 will always be logical 1. Since in this case the WSP Hit 0 and the WSP REG 0 r and the WSP REG 0 w bits all equal logical 1, the outputs of Inverters 358 and 364 will both be logical 0. Off course, this means that the last input to AND/OR Complex 354 will be a logical 0. In total, then, the four input values to AND/OR Complex 354 are as follows:

PTPV flag 353=logical 1;
Inverter 352 output=0;
WSP Hit 0=1; and
AND/OR Complex 360 output=0.

These inputs to AND/OR Complex 354 result in an output of logical 0 from AND/OR Complex 354. As stated in the high level overview, an output of logical 0 essentially overrides the base storage protection mechanism which authorizes Method A to proceed to access the data encapsulated in Server Object 265.

Method A Attempts to Access Data Outside the Range of Server Object 265

For the purposes of this example, assume that for some unknown reason (e.g., inadvertence or tampering) Method A attempts to access data outside the range of Server Object 265. As shown on FIG. 3C-1, the values in low order register 310 and high order register 313 remain the same. Assume that the address used by Method A is #2345678901234580 which is outside the range of #2345678901234560 to #234567890123457F. Therefore, the product of the offset and the length mask (i.e., the output of AND Gate 317) will be #1234580. When combined with the Segment ID, the address becomes #2345678901234580. This value is then compared to the OID contained in low order register 315 through the use of Compare Circuit 319. In this case, the values do not match, meaning that the output of Compare Circuit 319 (WSP Hit 0) is logical 0.

Figures 1, 3C:
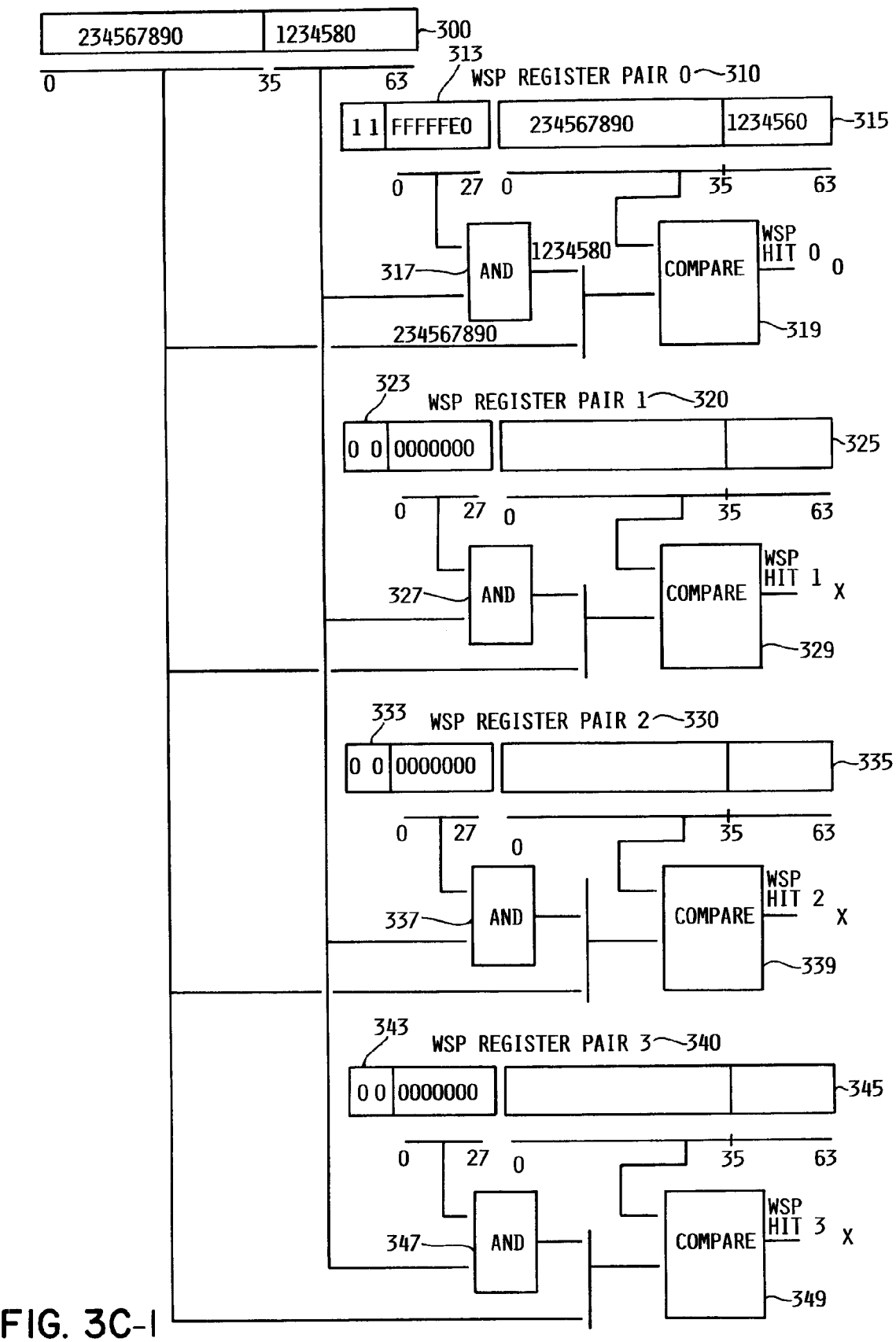
Figures 2, 3C:
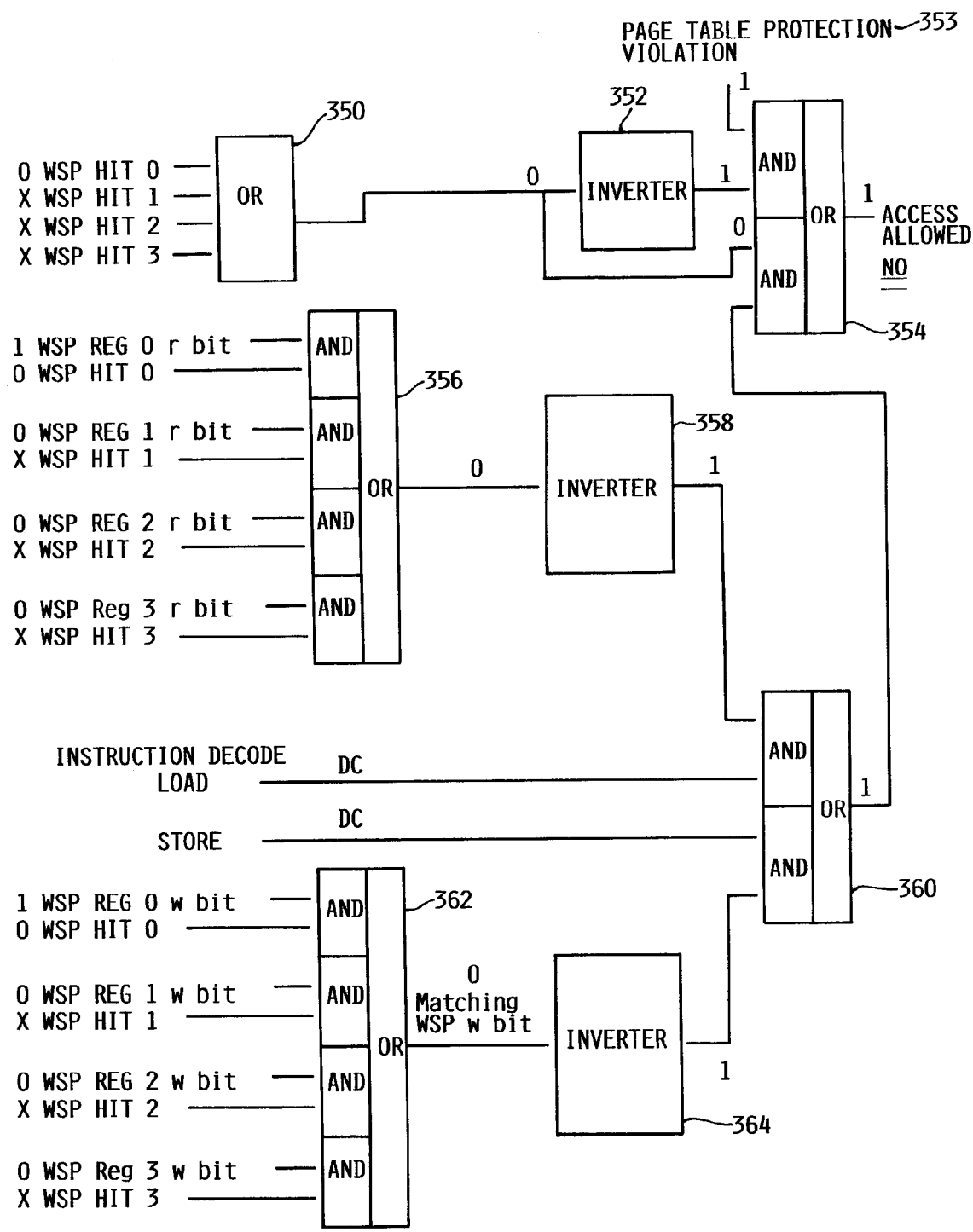

As shown on FIG. 3C-2, Method A's attempt to access data which is not encapsulated in Server Object 265 results in the following four input values to AND/OR Complex 354:

PTPV flag 353=logical 1;
Inverter 352 output=1;
WSP Hit 0=0; and
AND/OR Complex 360 output=1.

These inputs to AND/OR Complex 354 result in an output of logical 1 from AND/OR Complex 354. An output of logical 1 does not override the base storage protection mechanism. Therefore, Method A is prohibited from accessing data outside of the range of Server Object 265, thereby preserving encapsulation. The storage protection exception is taken and handled by OEEM 110. In the AS/400 exception handling scheme, OEEM 110, which would be considered a First Level Interrupt Handler in this case, save the process state and transfers control to a Second Level Interrupt Handler (not shown). The Second Level Interrupt Handler determines whether it can handle the exception directly. If not, the Second Level Interrupt Handler passes control to a Third Level Interrupt Handler. If the Third Level Interrupt Handler cannot handle the exception, the process, Method A in this case, is terminated. While the aforementioned is the preferred exception handling scheme, those skilled in the art will appreciate that other exception handling schemes are possible without departing from the spirit and scope of the present invention.

Method A Invokes Method B of Server Object 270

Continuing this example, assume that Method A wants to invoke Method B of Server Object 270 (hereafter Method B) to indirectly gain access to the data encapsulated in Server Object 270. This causes OEEM 110 to be invoked by Method B. As shown on FIG. 3D-1, OEEM 110 will load the OID for Server Object 270 (i.e., Starting Address 272) into the appropriate low order register. However, since WSP Register Pair 310 is in use because of Client Method 262's original call to Method A, OEEM will use WSP Register Pair 320 for the call from Method A to Method B. This time, OEEM 110 calculates an appropriate length mask for Length 273 and ascertains the read and write permissions of Method B. OEEM 10 will then load the mask and the permissions into high order register 323 (See FIG. 3D-1). As shown on FIG. 4, the appropriate length mask for an object that is 256 B in length is #FFFFF00. Assume for the purposes of this detailed example that Method B has both read and write permission.

After loading the WSP Register Pair 325 appropriately, OEEM 110 returns control to Method B. Method B then attempts to access the data encapsulated in Server Object 270. Since Method B is attempting to access data encapsulated in Server Object 270, the address used by Method B will be somewhere within the range of #0123456789ABCD00 to 0123456789ABCDFF. Therefore, the product of the offset and the length mask (i.e., the output of AND Gate 327) will be #9ABCD00. When combined with the Segment ID, the address becomes #23456789ABCD00. This value is then compared to the OID contained in low order register 315 through the use of Compare Circuit 319. In this case, the values match, meaning that the output of Compare Circuit 319 (WSP Hit 1) is logical 1. At this point, it is important to note that WSP Hit 0 becomes a logical 0 because the address presented by Method B does not fall within the memory space of Server Object 265.

Figures 1, 3D:
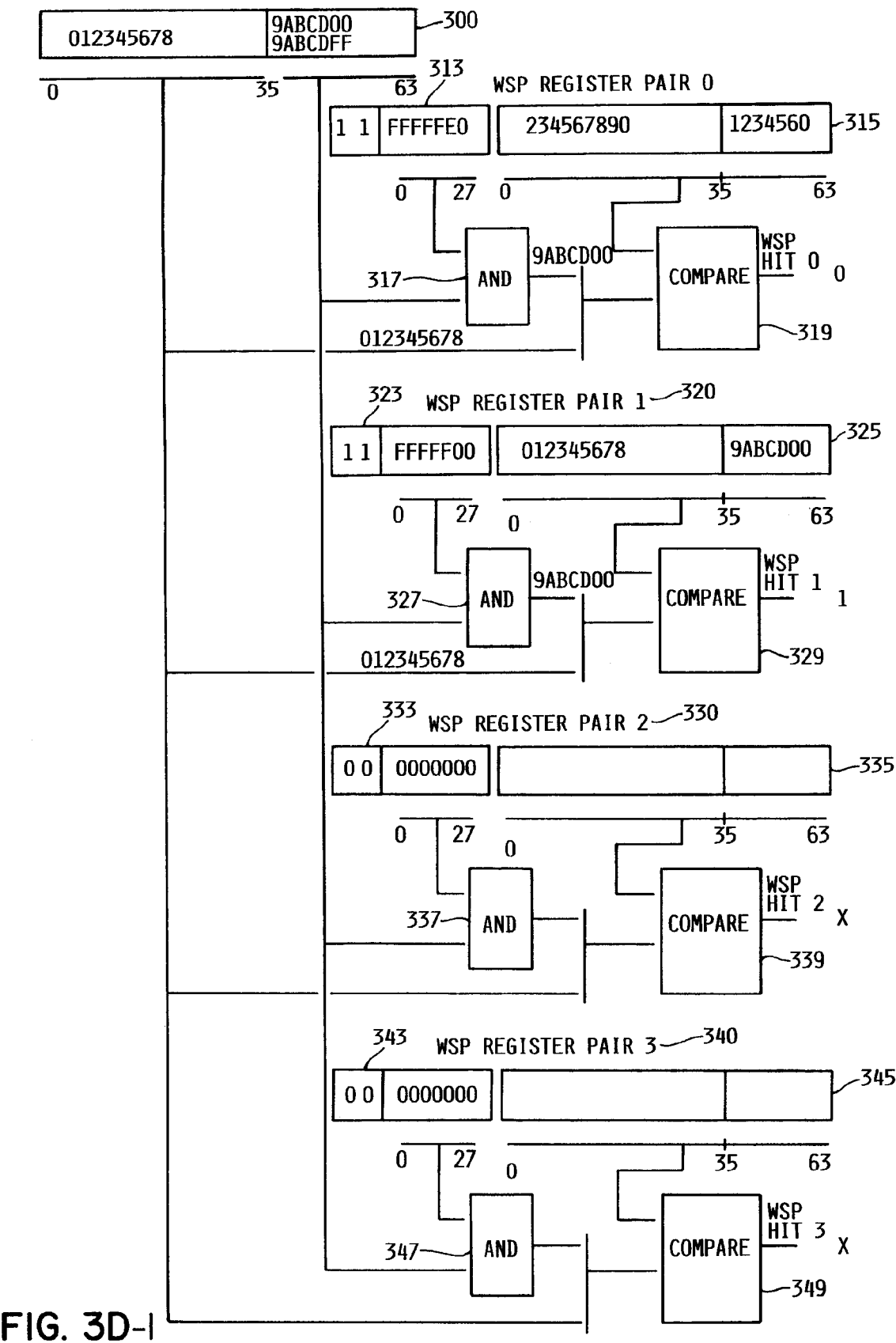
Figures 2, 3D:
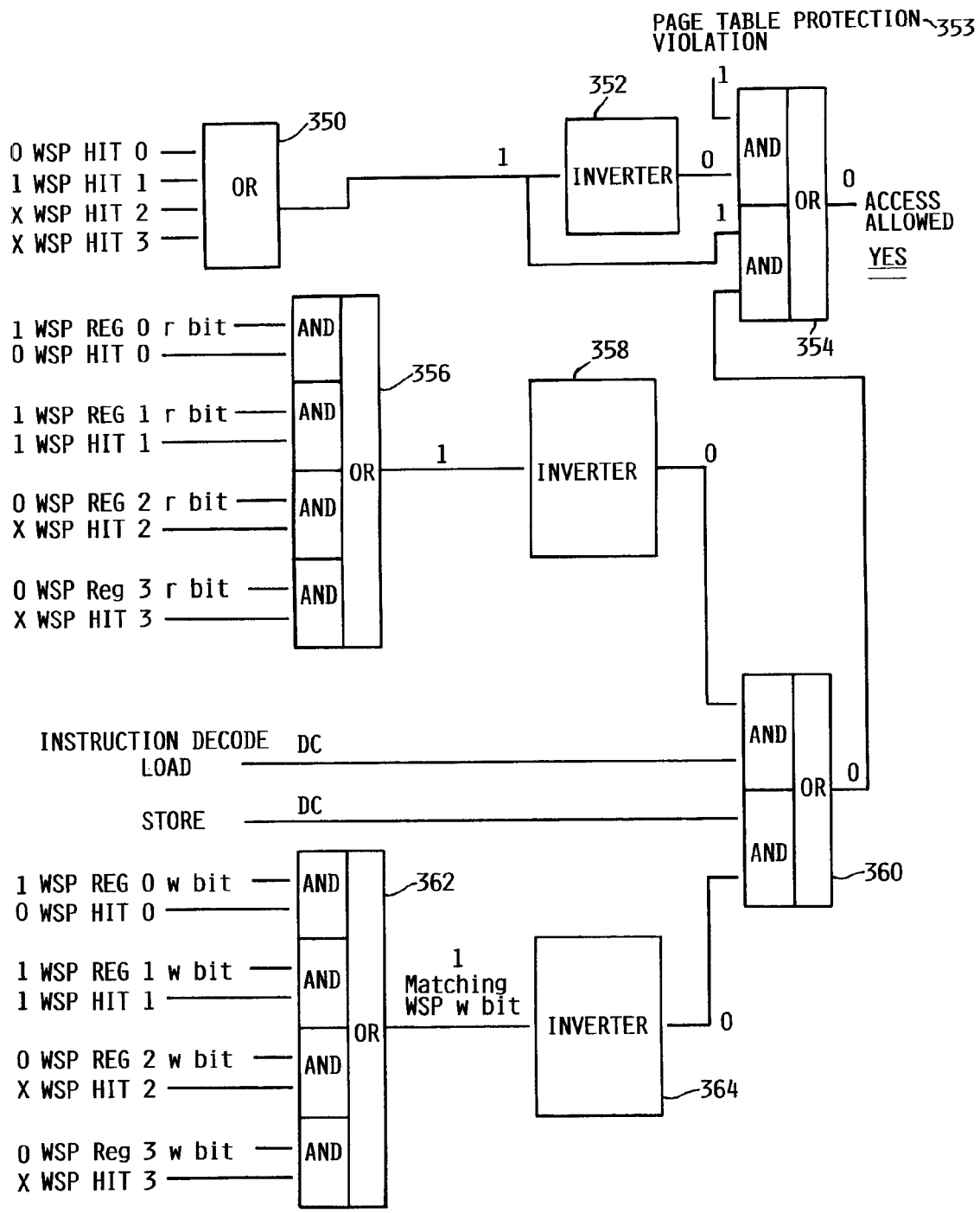

As shown on FIG. 3D-2, Method B's attempt to access data which is encapsulated in Server Object 270 results in the following four input values to AND/OR Complex 354 are as follows:

PTPV flag 353=logical 1;
Inverter 352 output=0;
WSP Hit 0=1; and
AND/OR Complex 360 output=0.

As before, these inputs to AND/OR Complex 354 result in an output of logical 0 from AND/OR Complex 354; and again, an output of logical 0 essentially overrides the base storage protection mechanism, thereby allowing Method B to proceed to access the data encapsulated in Server Object 270. At this point, it is important to note that WSP Hit 0 becomes logical 0 because the address presented by Method B does not fall within the memory space of Server Object 265. However, if Method B had instead presented an address within the memory space of Server Object 265, WSP Hit 0 would have become a logical 1, thereby allowing Method B to access the data encapsulated in Server Object 265 as well as the data encapsulated in Server Object 270. So long as a method program is invoked as part of an explicit method program call, or chain of method program calls (i.e., a method program which calls another which calls another etc.), the called method program can access the data encapsulated in the object which initiated the call or the objects which are part of the chain of invocations. This aspect of the present invention is important because it allows method programs to access data which is passed by reference as part of the method program call.

Method B Invokes Method C of Server Object 275

Continuing this example, assume that Method B now wants to invoke Method C of Server Object 270 hereafter Method C) to indirectly gain access to the data encapsulated in Server Object 275. Again, this similarly causes OEEM 110 to be invoked by Method C. As shown on FIG. 3E-1, OEEM 110 will load the OID for Server Object 275 (i.e., Starting Address 276) into the appropriate low order register. However, since WSP Register Pairs 310 and 320 are in use because of the previous calls to Method A and Method B, OEEM 110 will use WSP Register Pair 330 for the call from Method B to Method C. This time, OEEM 110 calculates an appropriate length mask for Length 277 and ascertains the read and write permissions of Method C. OEEM 110 will then load the mask and the permissions into high order register 333 (See FIG. 3E-1). As shown on FIG. 4, the appropriate length mask for an object that is 128 B in length is #FFFFF80. Assume for the purposes of this detailed example that Method C has read, but not write permission.

After loading the WSP Register Pair 330 appropriately, OEEM 110 returns control to Method C. Method C will then attempt to access the data encapsulated in Server Object 275. Since Method C is attempting to access data encapsulated in Server Object 275, the address used by Method C will be somewhere within the range of #0123456789ABCE00 to #0123456789ABCE7F. Therefore, the product of the offset and the length mask (i.e., the output of AND Gate 337) will be #9ABCE00. When combined with the Segment ID, the address becomes #0123456789ABCE00. This value is then compared to the OID contained in low order register 335 through the use of Compare Circuit 339. In this case, the values match, meaning that the output of Compare Circuit 339 (WSP Hit 2) is logical 1. At this point, it is again important to note that WSP Hit 0 and WSP Hit 1 become a logical 0 because the address presented by Method C does not fall within the memory space of either Server Object 265 or Server Object 270. However, if Method C had instead presented an address within the memory space of Server Object 265 or Server Object 270, WSP Hit 0 or WSP Hit 1 (as the case may be) would have become a logical 1, thereby allowing Method C to access the data encapsulated in Server Object 265 and Server Object 270 as well as the data encapsulated in Server Object 275. Again, so long as a method program is invoked as part of an explicit method program call, or chain of method program calls, the called method program can access the data encapsulated in the object which initiated the call or the objects are part of the chain of invocations. As mentioned, this aspect of the present invention is important because it allows method programs to access data which is passed by reference as part of the method program call.

Figures 1, 3E:
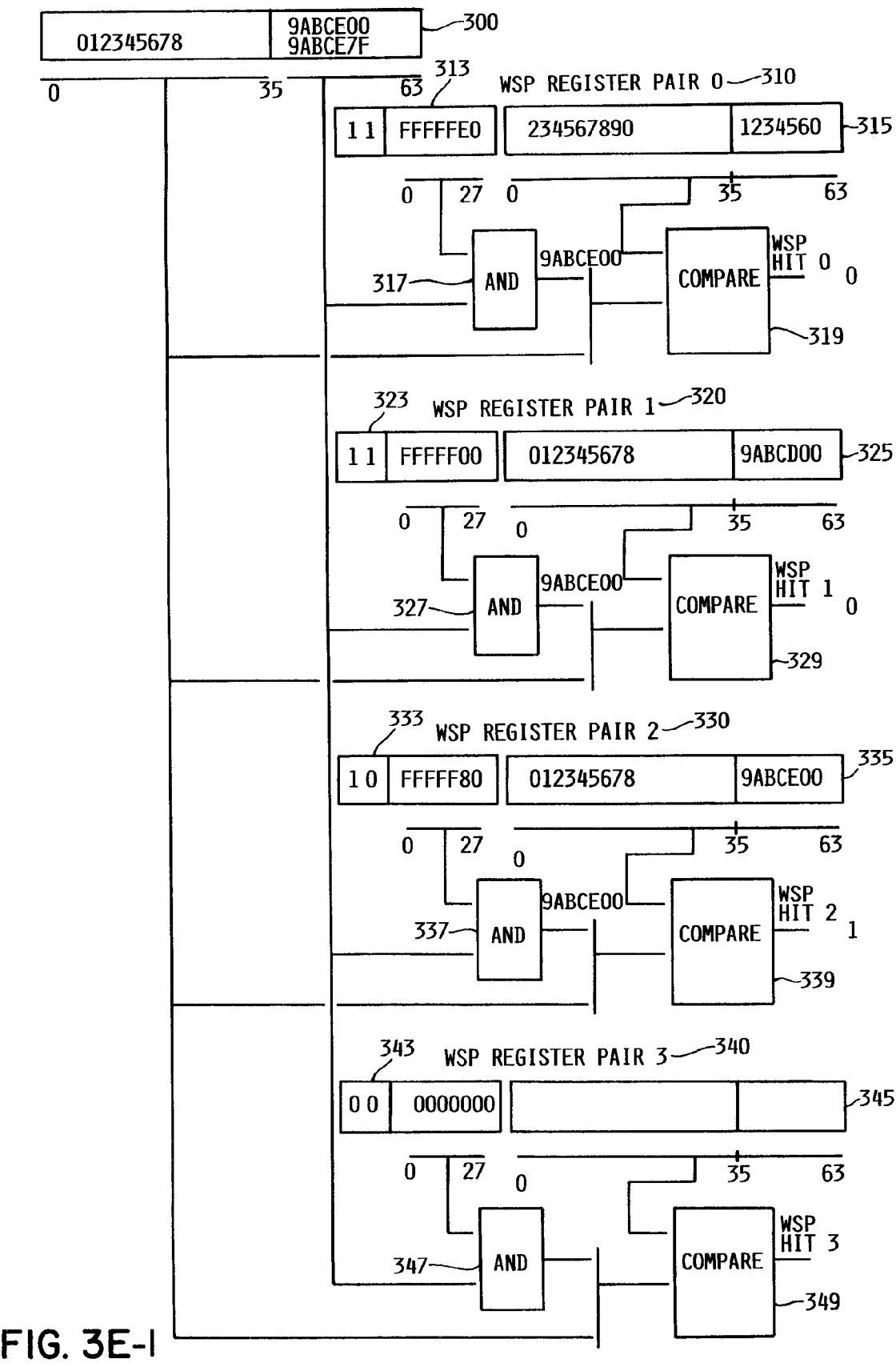
Figures 2, 3E:
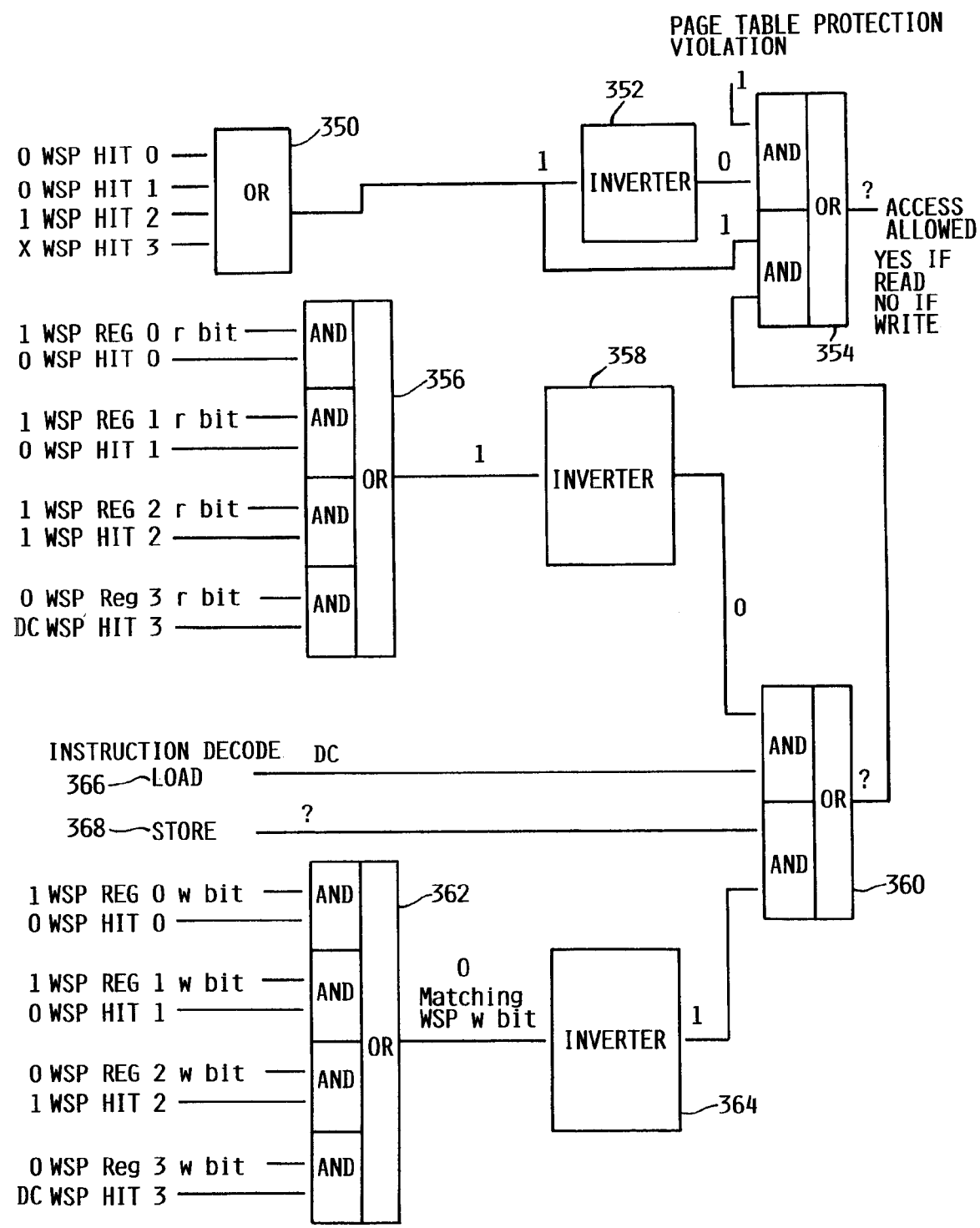

Please refer now to FIG. 3E-2. Since in this case Method C has read permission, but not write permission, Instruction Decode flags Load 366 and Store 368 come into play. As mentioned in the high level overview, the output of AND/OR Complex 360 is derived from Inverters 358 and 364, from AND/OR Complexes 356 and 362, and from Instruction Decode flags Load 366 and Store 368. Instruction Decode flags Load 366 and Store 368 represent the particular operation that is sought to be performed by Method C (i.e., Load=read and Store=write). In this example, Method C has read permission, but not write permission; causing WSP REG 2 r bit will be a logical 1 and the WSP REG 2 w bit to be a logical 0. This means that the output of Inverter 358 will be logical 0, but that the output of Inverter 364 will be logical 1. Therefore, the value of Store flag 368 becomes important If Method C attempts to read the data encapsulated in Server Object 275 (i.e., a permitted activity), the four input values to AND/OR Complex 354 are as follows:

PTPV flag 353=logical 1;
Inverter 352 output=0;
WSP Hit 1=1; and
AND/OR Complex 360 output=0.

Of course, as previously explained, these values result in an output of logical 0 from AND/OR Complex 354 which overrides the base storage protection mechanism, thereby allowing Method C to proceed to access the data encapsulated in Server Object 275.

However, if Method C attempts to modify the data encapsulated by Server Object 275 (i.e., a forbidden activity), the four input values to AND/OR Complex 354 are as follows:

PTPV flag 353=logical 1;
Inverter 352 output=0;
WSP Hit 1=1; and
AND/OR Complex 360 output=1.

These inputs to AND/OR Complex 354 result in an output of logical 1 from AND/OR Complex 354. As mentioned above, an output of logical 1 does not override the base storage protection mechanism. Therefore, Method C would be prohibited from modifying data encapsulated in Server Object 275.

Method C Invokes Method D of Server Object 280

Continuing this example, assume that Method C wants to invoke Method D of Server Object 280 (hereafter Method D) to indirectly gain access to the data encapsulated in Server Object 280. This causes OEEM 110 to be invoked by Method D. As shown on FIG. 3F-1, OEEM 110 will load the OID for Server Object 280 (i.e., Starting Address 281) into the appropriate low order register. However, since WSP Register Pairs 310, 320, and 330 are in use because of the previous calls to Method A, Method B, and Method C, OEEM 110 will use WSP Register Pair 340 for the call from Method C to Method D. This time, OEEM 110 calculates an appropriate length mask for Length 283 and ascertains the read and write permissions of Method D. OEEM 110 will then load the mask and the permissions into high order register 343 (See FIG. 3F-1). As shown on FIG. 4, the appropriate length mask for an object that is 8 KB in length is #FFFE000. Assume for the purposes of this example that Method D has write, but not read permission.

After loading the WSP Register Pair 340 appropriately, OEEM 110 returns control to Method D. Method D will then attempt to access the data encapsulated in Server Object 280. Since Method D is attempting to access data encapsulated in Server Object 280, the address used by Method D will be somewhere within the range of #23456789012320000 to #23456789012333FFF. Therefore, the product of the offset and the length mask (i.e., the output of AND Gate 347) will be #1232000. When combined with the Segment ID, the address becomes #23456789012320000. This value is then compared to the OID contained in low order register 325 through the use of Compare Circuit 349. In this case, the values match, meaning that the output of Compare Circuit 349 (WSP Hit 3) is logical 1.

Figures 1, 3F:
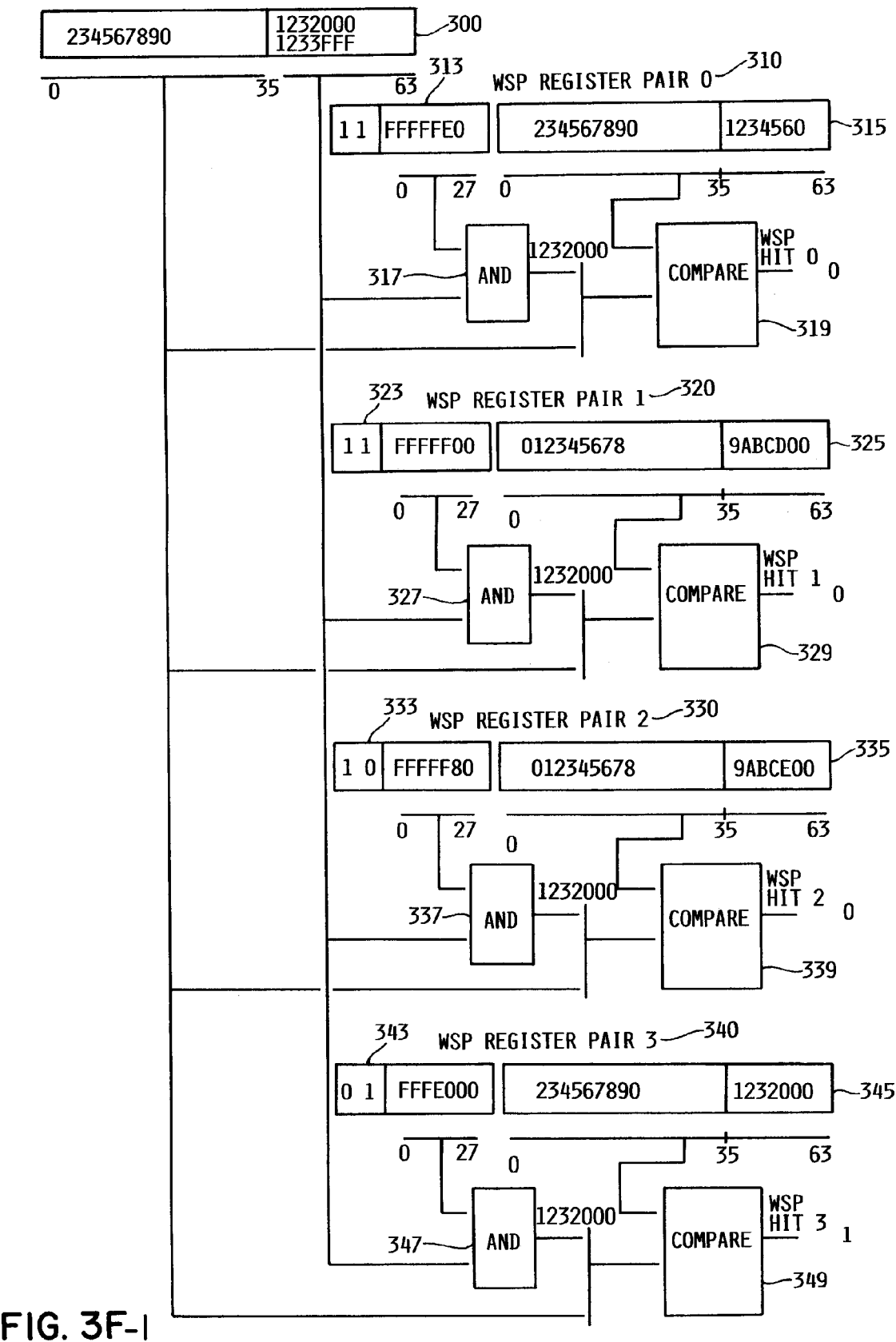
Figures 2, 3F:
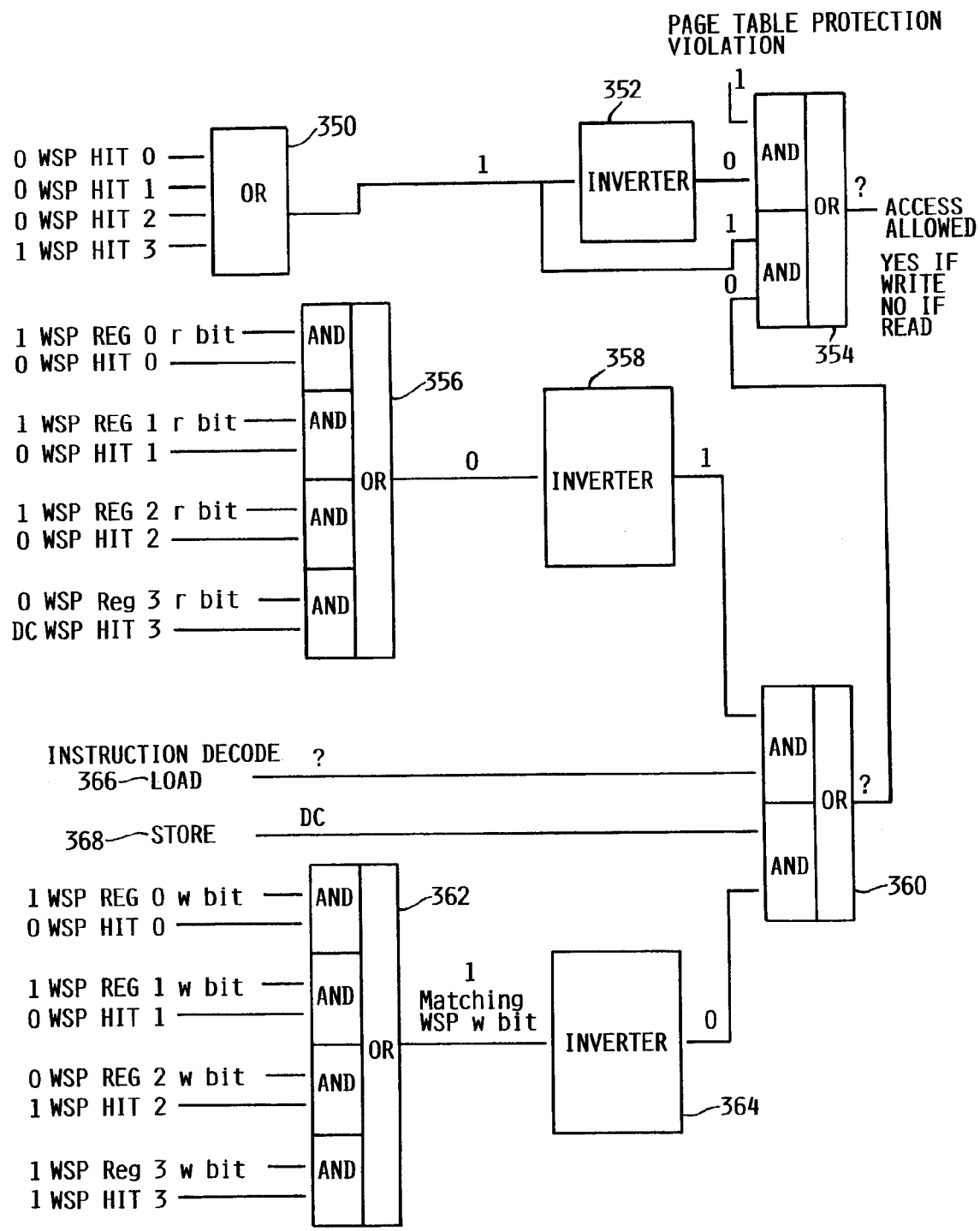

Please refer now to FIG. 3F-2. Since in this case Method D has write permission, but not read permission, Instruction Decode flags Load 366 and Store 368 to again come into play. In this example, Method D has write permission, but not read permission; causing WSP REG 2 w bit to be a logical 1 and the WSP REG 2 r bit to be a logical 0. This means that the output of Inverter 364 will be logical 0, but that the output of Inverter 358 will be logical 1. Therefore, the value of Read flag 366 becomes important. If Method D attempts to modify the data encapsulated in Server Object 280 (i.e., a permitted activity), the four input values to AND/OR Complex 354 are as follows:

PTPV flag 353=logical 1;

Inverter 352 output=0;

WSP Hit 1=1; and

AND/OR Complex 360 output=0.

Of course, as previously explained, these values result in an output of logical 0 from AND/OR Complex 354 which overrides the base storage protection mechanism, thereby allowing Method D to proceed to modify the data encapsulated in Server Object 275.

However, if Method A attempts to read the data encapsulated by Server Object 280 (i.e., a forbidden activity), the four input values to AND/OR Complex 354 are as follows:

PTPV flag 353=logical 1;

Inverter 352 output=0;

WSP Hit 1=1; and

AND/OR Complex 360 output=1.

These inputs to AND/OR Complex 354 result in an output of logical 1 from AND/OR Complex 354. As mentioned above, an output of logical 1 does not override the base storage protection mechanism. Therefore, Method D would be prohibited from reading the data encapsulated in Server Object 280.

Register Overflow Condition

As mentioned above, the use of four WSP Register Pairs within the preferred embodiment is a design choice. If, at this point, Method D were to call yet another method, say Method E (not shown), the register management scheme of the preferred embodiment would call for the contents of WSP Register Pair 310 to be saved in data storage 140. OEEM 110 would then use WSP Register Pair 310 to handle the call to Method E. However, it will be appreciated by those skilled in the art that there are any number of alternative register management schemes that would fall within the spirit and scope of the present invention. For example, special dynamic registers could be allocated to handle the overflow condition or OEEM 110 could be enhanced to determine whether the called method already occupied one of the four register pairs.

Method D Returns Control to Method C

Figures 1, 3G:
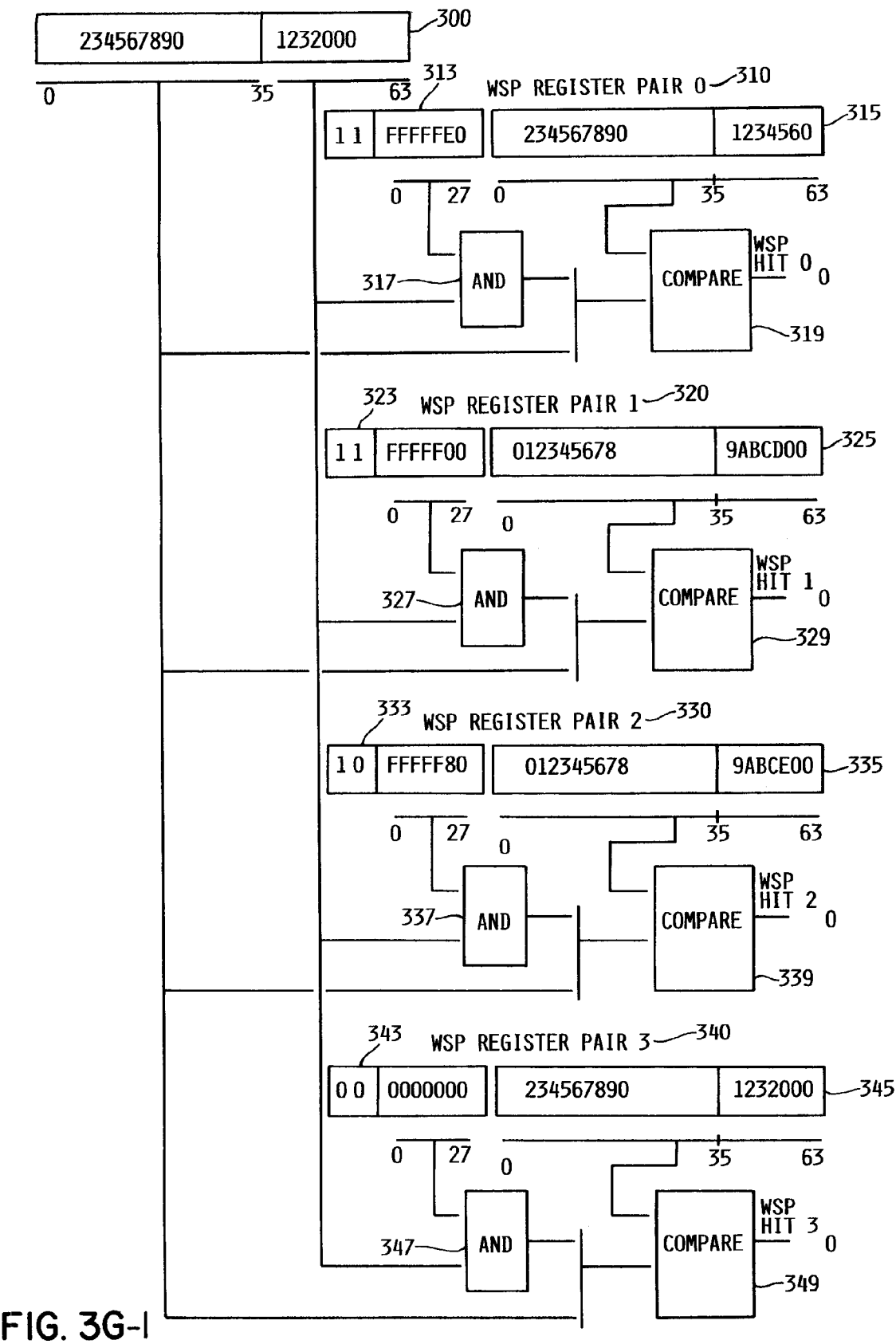
Figures 2, 3G:
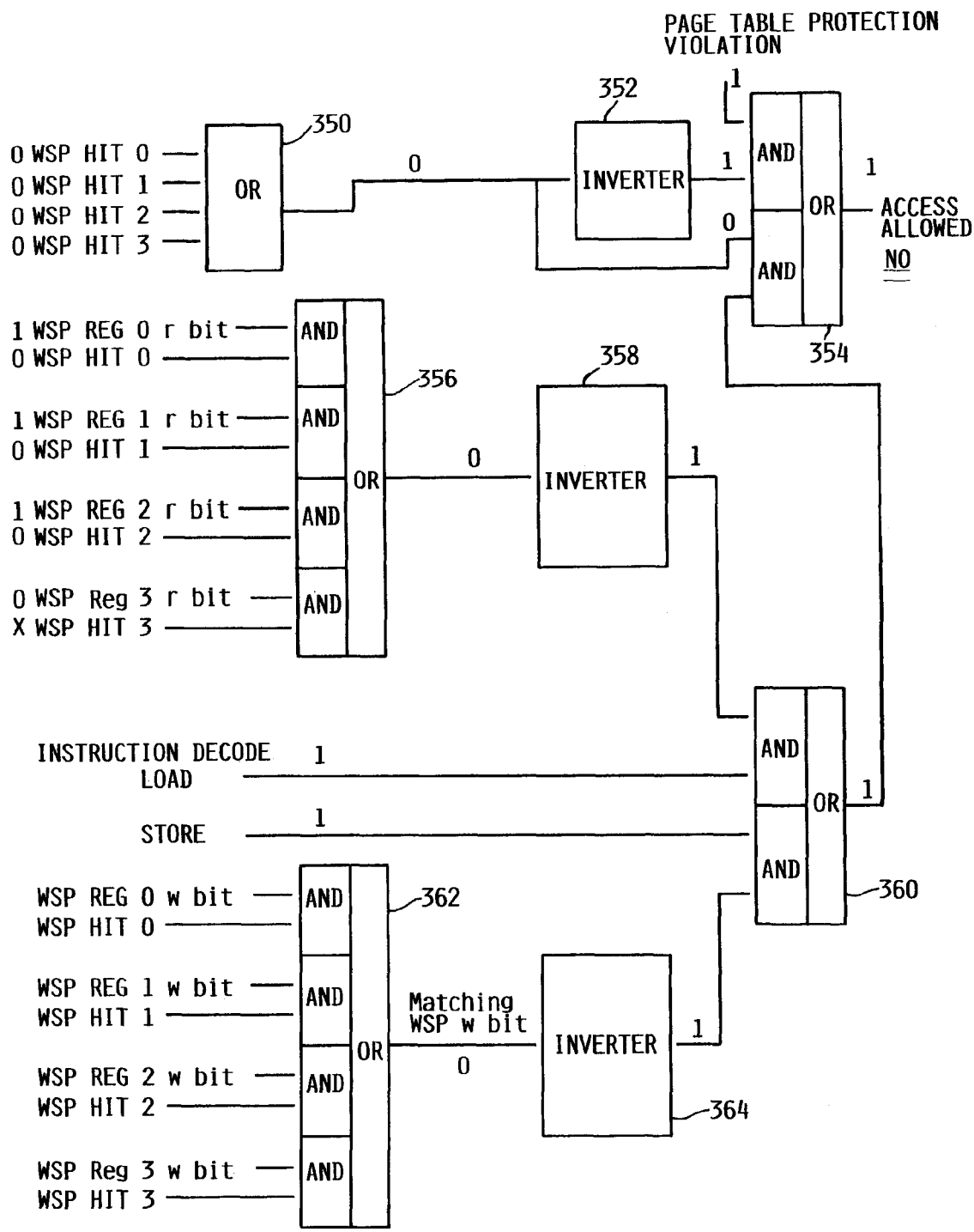

Lastly, assume that Method D returns control to Method C and that Method C attempts to access the data encapsulated in a server object other than Server Object 275. FIG. 3G-1 shows that high order register contains a Nill mask (i.e., the register contains only 0's). As mentioned in the high level overview, OEEM 110 places a Nill mask in the high order register (i.e., high order register 343 in this case) at the end of each data access. In other words, at the end of each method call OEEM 110 resumes control over CPU 105, loads a Nill mask into the particular high order register, and returns control to the method program (i.e., Method C in this case). Of course, the Nill mask causes WSP Hit 3 to be logical 0. Assume that at this point Method C attempts to access the data encapsulated in Server Object 280 without first invoking Method D through OEEM 110. As shown on FIG. 3G-2, this access will not be permitted. The fact that WSP Hit 0, WSP Hit 1, WSP Hit 2, and WSP Hit 3 are all equal to logical 0 means that the output of Inverter 353 will be logical 1. The four input values to AND/OR Complex 354 then become:

PTPV flag 353=logical 1;

Inverter 352 output=1;

WSP Hit 1=0; and

AND/OR Complex 360 output=1.

The output of logical 1 does not override the base storage protection mechanism. Therefore, Method C would be prohibited from accessing the data encapsulated in Server Object 280.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A data protection apparatus, said data protection apparatus comprising:

a first object, said first object being stored on a computer system;

first object data and a first at least one method program associated with said first object; and a storage protection mechanism which enforces encapsulation of said first object, said storage protection mechanism enforcing encapsulation by restricting access to said first object data to only first authorized method programs, said first authorized method programs being a set of method programs which includes at least one method program, said first method program being included in said first authorized method programs.

2. The data protection apparatus of claim 1 wherein said first authorized method programs include a second method program, said second method program being associated with a chain of method program calls, said chain of method program calls involving at least said first method program and said second method program.

3. The data protection apparatus of claim 2 wherein said second method program is associated with a second object and wherein said second method program is permitted to access second object data associated with said second object, said second method program being one of second authorized method programs, said second authorized method programs being a set of method programs which includes at least one method program.

4. The data protection apparatus of claim 3 wherein said first authorized method programs are not permitted to access data other than said first object data and said second authorized method programs are not permitted to access data other than said first object data and said second object data.

5. The data protection apparatus of claim 4 wherein said encapsulation enforcement mechanism further restricts access based on access permissions that are associated with said first authorized method programs and said second authorized method programs.

6. The data protection apparatus of claim 5 further comprising an Object Encapsulation Enforcement Manager and a Window Storage Protection Controller.

7. The data protection apparatus of claim 6 wherein said Object Encapsulation Enforcement Manager further comprises means for opening a first access window for said first authorized method programs and for said second authorized method programs, said first access window being a first address range within data storage, said first address range corresponding in location and size to said first object.

8. The data protection apparatus of claim 7 wherein said Object Encapsulation Enforcement Manager further comprises means for opening a second access window for said second authorized method programs, said second access window being a second address range within said data storage, said second address range corresponding in location and size to said second object.

9. The data protection apparatus of claim 8 wherein said Window Storage Protection Controller further comprises at least one window storage protection register pair, said at least one window storage protection register pair comprising a low order register and a high order register.

10. The data protection apparatus of claim 9 wherein said Object Encapsulation Enforcement Manager further comprises means for loading an object ID into said low order register and means for loading a merged mask into said high order register, said object ID being a starting address of said first object, said merged mask being access permissions combined with a binary representation of said first object's length.

11. A method for providing data protection within a computer system, said method comprising the machine executed steps of:

calling a first server method program of a first server object, said first server method program being one of at least one first server method programs associated with said first server object, said first server object having first object data and being stored on a computer system, said first server object being called by a client object;

enforcing encapsulation of said first server object by restricting access to said first object data to only first authorized method programs, said first authorized method programs being a set of method programs which includes at least one method program, said first server method program being included in said first authorized method programs.

12. The method of claim 11 wherein said first authorized method programs include a second server method program, said second server method program being further associated with a chain of method program calls, said chain of method program calls involving at least said first server method program and said second server method program.

13. The method of claim 12 comprising the step of permitting said second server object to access second object data associated with a second server object, said second server method program being one of at least one second server method programs associated with said second server object, said second server method program also being one of second authorized method programs, said second authorized method programs being a set of method programs which includes at least one method program.

14. The method of claim 13 further comprising the steps of:

permitting said first authorized method programs to access only said first object data; and permitting said second authorized method programs to access only said first object data and said second object data.

15. The method of claim 14 wherein said enforcing step further comprises the step of restricting access based on access permissions that are associated with said first authorized method programs and said second authorized programs.

16. The method of claim 15 further comprising the step of:

opening a first access window for said first authorized method programs and for said second authorized method programs, said first access window being a first address range within data storage, said first address range corresponding in location and size to said first object.

17. The method of claim 16 comprising the step of:

opening a second access window for said second authorized method programs, said second access window being a second address range within said data storage, said second address range corresponding in location and size to said second object.

18. The method of claim 17 further comprising the steps of:

loading a first object ID into a first low order register, said first object ID being a starting address of said first object;

loading a first merged mask into a first high order register, said first merged mask being access permissions combined with a binary representation of said first object's length.

19. The method of claim 18 further comprising the steps of:

loading a second object ID into a second low order register, said second object ID being a starting address of said second object;

loading a second merged mask into a second high order register, said second merged mask being access permissions combined with a binary representation of said second object's length.

20. A computer system, said computer system comprising:

a central processing unit;

data storage;

at least one system bus;

a first object, said first object being stored in said data storage;

first object data and a first at least one method program associated with said first object; and a storage protection mechanism which enforces encapsulation of said first object, said storage protection mechanism enforcing encapsulation by restricting access to said first object data to only first authorized method programs, said first authorized method programs being a set of method programs which includes at least one method program, said first method program being included in said first authorized method programs.

21. The computer system of claim 20 wherein said first authorized method programs include a second method program, said second method program being associated with a chain of method program calls, said chain of method program calls involving at least said first method program and said second method program.

* * * * *